United States Patent
Oota et al.

(10) Patent No.: US 8,364,096 B2
(45) Date of Patent: Jan. 29, 2013

(54) TRANSMISSION DEVICE, AND ARRAY ANTENNA CONTROL METHOD AND DEVICE

(75) Inventors: Yoshiyuki Oota, Kawasaki (JP); Takanori Iwamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 12/565,295

(22) Filed: Sep. 23, 2009

(65) Prior Publication Data

US 2010/0035566 A1 Feb. 11, 2010

Related U.S. Application Data

(63) Continuation of application No. PCT/JP2007/056648, filed on Mar. 28, 2007.

(51) Int. Cl.
H04B 1/02 (2006.01)
H04B 1/04 (2006.01)

(52) U.S. Cl. ..... 455/103; 455/100; 455/112; 455/562.1; 455/561; 370/319; 370/320; 370/344; 375/130; 375/140; 375/260

(58) Field of Classification Search ............... 455/562.1, 455/561, 452.1, 277.1, 450, 453, 434, 560, 455/63.3, 101, 103, 112; 375/130, 140, 260; 370/319, 320, 344
See application file for complete search history.

(56) References Cited

U.S. PATENT DOCUMENTS

| | | | | |
|---|---|---|---|---|
| 7,233,812 B2 * | 6/2007 | Okawa et al. | ............... | 455/562.1 |
| 7,546,623 B2 * | 6/2009 | Ramraz et al. | ................... | 725/48 |
| 2002/0044591 A1 * | 4/2002 | Lee et al. | ........................ | 375/130 |
| 2003/0016641 A1 * | 1/2003 | Terry et al. | ..................... | 370/335 |
| 2005/0070331 A1 | 3/2005 | Higuchi et al. | | |
| 2005/0073976 A1 | 4/2005 | Fujii | | |
| 2005/0099937 A1 | 5/2005 | Oh et al. | | |
| 2006/0176970 A1 * | 8/2006 | Dai et al. | ....................... | 375/267 |
| 2009/0279486 A1 | 11/2009 | Kishigami et al. | | |

FOREIGN PATENT DOCUMENTS

| | | |
|---|---|---|
| JP | 2003060549 | 2/2003 |
| JP | 2003158479 | 5/2003 |
| JP | 200564546 | 3/2005 |
| JP | 2005110130 | 4/2005 |
| JP | 2005151567 | 6/2005 |
| JP | 2005176160 | 6/2005 |
| JP | 2005323217 | 11/2005 |
| JP | 2006005874 | 1/2006 |
| JP | 2006254235 | 9/2006 |
| JP | 2006319959 | 11/2006 |

OTHER PUBLICATIONS

Notification of Reasons for Refusal dated Sep. 20, 2011, from the corresponding Japanese Application No. 2009-507307.
Notification of Reasons for Refusal dated Apr. 12, 2011, from the corresponding Japanese Patent Application No. 2009-507307. Final Decision for Refusal Office Action dated Dec. 13, 2011 received in Japanese Patent Application No. 2009-507307.
Decision for Dismissal of Amendment dated Dec. 13, 2011 received in Japanese Patent Application No. 2009-507307.
International Search Report dated Jul. 24, 2007.

* cited by examiner

Primary Examiner — Tuan Pham
(74) Attorney, Agent, or Firm — Murphy & King, P.C.

(57) ABSTRACT

For transmitting a common channel signal with characteristics with an approximated non-directivity, the common channel signal for all users is divided into sub-channel signals, corresponding to a number of antenna elements composing an array antenna, to be concurrently transmitted with non-directivity by using each antenna element. Individual channel signals, for each user, following the common channel signal with a desired directivity by using the antenna elements. Each sub-channel signal can be made a sub-channel signal obtained by dividing all sub-channel components composing the common channel signal for each sub-channel component by a predetermined number or dividing them depending on a receiving quality of each antenna element.

18 Claims, 11 Drawing Sheets

TRANSMISSION DEVICE, AND ARRAY ANTENNA CONTROL METHOD AND DEVICE

CROSS-REFERENCE TO RELATED APPLICATION

This application is a continuation of International Application PCT/JP2007/56648 filed on Mar. 28, 2007, the contents of which are herein wholly incorporated by reference.

BACKGROUND

1. Field

The present invention relates to a transmission device as well as an array antenna control method and device, which are preferably used in a base station etc. composing a wireless communication system.

2. Description of the Related Art

Related art examples [1]-[3] as described herebelow are known in the array antenna control art for a base station:

Related Art Example [1]: Not Shown

A base station in a wireless communication system transmits a common channel signal to be propagated to overall a cell (i.e. all users) by using a dedicated (exclusive use) non-directivity antenna.

On the other hand, individual channel signals for users following the above common channel signal are transmitted by using an array antenna after having adjusted the amplitude and the phase thereof so that each individual channel signal may have a desired directivity due to interferences among antenna elements composing the array antenna. This enables each individual channel signal to be propagated to each user without requiring a high transmission power.

However, due to requiring a dedicated non-directivity antenna for propagating the common channel signal, the setting space interferes with a miniaturization of the base station and increases development costs.

In order to address this, related art examples [2] and [3] as described herebelow have already been proposed:

Related Art Example [2]: Not Shown

A base station in a W-CDMA (Wideband Code Division Multiple Access) or TDMA (Time Division Multiple Access) wireless communication system performs a signal transmission by using one of antenna elements composing an array antenna when propagating the common channel signal (See, e.g. Japanese patent application publication No.2003-158479 or No. 2005-176160).

Related Art Example [3]: Not Shown

A base station in a W-CDMA wireless communication system provides the common channel signal to all antenna elements composing the array antenna to be transmitted (See, e.g. Japanese patent application publication Nos. 2006-5874 and 2003-60549).

The above related art examples [2] and [3] eliminate the use of the dedicated non-directivity antenna such as in the above related art example [1].

In the above related art example [2], one antenna element of the array antenna is employed to transmit the common channel signal, whereat a high transmission power of propagating the common channel signal to overall the cell is required, so that amplifiers or the like connected to the antenna elements should be of a high performance and a high output, increasing a power consumption and development costs of the entire base station.

Also, in the above related art example [3], the common channel signal of the same frequency is transmitted from each antenna element, thereby causing interferences where a null direction with no signals being propagated exists, so that the common channel signal is eventually transmitted with some directivity, failing to achieve non-directivity.

SUMMARY

It is accordingly an object of the present invention to provide a transmission device as well as an array antenna control method and device enabling a transmission with an approximated non-directivity.

[1] In order to achieve the above-mentioned object, there is provided a transmission device comprising an array antenna including a plurality of antenna elements, and a portion applying signals of different frequencies respectively to the above plurality of antenna elements so as to be transmitted respectively from the plurality of antenna elements.

Hereby, it becomes possible to transmit e.g. a common channel signal with non-directivity.

[2] Also, in the above [1], the signals respectively applied to the above plurality of antenna elements may comprise signals, to be transmitted with e.g. a plurality of frequencies, respectively assigned to the plurality of antenna elements depending on the frequencies.

[3] Also, in the above [1], the signals respectively applied to the plurality of antenna elements may comprise signals in which pieces of announcement information transmitted with e.g. the different frequencies are respectively assigned to the plurality of antenna elements depending on the frequencies.

[4] Also, in the above [1], the transmitting may be performed at a first timing and the signals transmitted may be respectively applied in common to the plurality of antenna elements at a second timing, thereby transmitting the signals with a directivity.

[5] Also, in the above [1], a processor changing the frequencies of the signals respectively applied to the plurality of antenna elements depending on a received radio wave quality in each of the plurality of antenna elements may be comprised.

[6] Also, in order to achieve the above-mentioned object, there is provided an array antenna control method (or device) comprising a first step of (or means) dividing a common channel signal to all users into sub-channel signals, by a number of antenna elements composing an array antenna, to be concurrently transmitted with non-directivity by using the antenna elements, and a second step of (or means) transmitting individual channel signals, for each user, following the common channel signal with a desired directivity by using the antenna elements.

Namely, the common channel signal is divided into the antenna elements composing the array antenna as sub-channel signals, thereby being concurrently transmitted with non-directivity.

Thus, the sub-channel signals are composed of mutually different sub-channel components (frequency components), not causing interferences, thereby providing a non-directivity of a more complete characteristic. Also, for amplifiers etc. connected to the antenna elements, those with a low performance and a low output having a low power consumption may be used, enabling transmission power required for the propagation of the common channel signal to be reduced to a large extent.

[7] Also, in the above [6], the first step (or means) may comprise a third step of (or means) preparing a table associating sub-channel components composing the common channel signal with the antenna elements, and a fourth step of (or means) sorting data for each sub-channel component in the common channel signal based on the table, thereby generating the sub-channel signals.

Thus, it is possible to easily generate the sub-channel signals by using a table associating the sub-channel components composing the common channel signal with the antenna elements.

[8] Also, in the above [7], the table may associate each sub-channel obtained by dividing e.g. all sub-channel components for every sub-channel components by a predetermined number, with each antenna element.

[9] Also, in the above [7], the table may associate each sub-channel obtained by selecting or dividing e.g. all sub-channel components by a predetermined number in order, with each antenna element.

[10] Also, in the above [8], the third step (or means) may comprise a step of changing in a circulating mode the associating of each sub-channel with each antenna element in the table every time the common channel signal is generated.

[11] Also, in the above [6], the first step (or means) may comprise a third step of (or means) preparing a table associating each sub-channel component composing the common channel signal with each antenna element depending on a given received radio wave quality for each antenna element, and a fourth step of (or means) sorting data for each sub-channel component in the common channel signal based on the table, thereby generating each sub-channel signal.

Namely, in this case, it becomes possible to generate the sub-channel signals depending on received radio wave qualities of the antenna elements, thereby reliably propagating the common channel signal to all users.

[12] Also, in the above [11], the table may associate at least one sub-channel component among e.g. all sub-channel components with one antenna element, where when there remains a sub-channel component, the remaining sub-channel component is assigned to each antenna element depending on a ratio between received radio wave qualities of the antenna elements.

[13] Also, in the above [6], the first step (or means) may comprise a step of (or means) applying each sub-channel signal as a signal without directivity to each antenna element and, the second step (or means) may comprise a step of (or means) adjusting an amplitude and a phase of each individual channel signal for each antenna element so that each individual channel signal has the desired directivity due to interferences among the antenna elements.

[14] Also, in any one of the above [6], the common channel signal and the individual channel signals may compose a downlink frame according to e.g. a frequency division multiplying method.

Thus, it is possible to provide the transmission device as well as the array antenna control method and device enabling the transmission with an approximated non-directivity.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Embodiments [1] and [2] of a base station according to a transmission device as well as an array antenna control method and a device using the method will now be described referring to FIGS. 1-11.

Embodiment [1]: FIGS. 1-8

Figure 1:
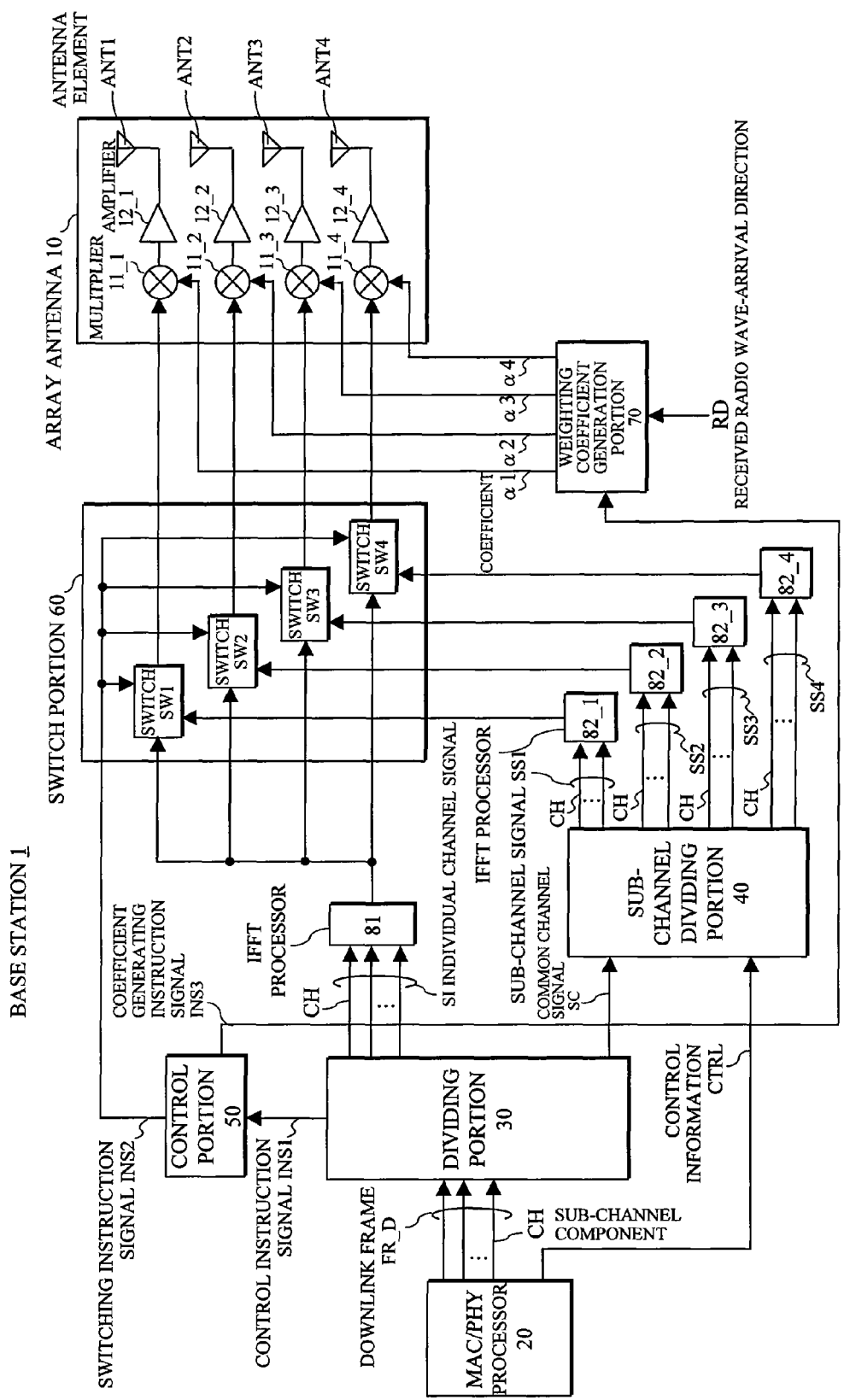
FIG. 1 is a block diagram showing an arrangement in an embodiment [1] of a transmission device as well as an array antenna control method and device.

Arrangement: FIG. 1

This arrangement will be described referring to a base station corresponding to a WiMAX communication system prescribed by IEEE 802.16, where it is of course that transmission devices corresponding to other communication systems may be applied.

A base station 1 in this embodiment shown in FIG. 1 comprises an array antenna 10 having a plurality of antenna elements (here, four antenna elements) ANT1-ANT4; a MAC/PHY processor 20 for generating a plurality of sub-channel components CH composing a downlink frame FR_D; a dividing portion 30 for dividing each sub-channel component CH into signals to be transmitted with a directivity (here, signals, destined to terminals in an area, to be transmitted within burst data transmitting area defined by MAP data, which will be hereinafter referred to as individual channel signals) SI and a signal to be transmitted without a directivity (here, signals to be informed to the terminals in the area such as preamble, MAP data etc., which will be hereinafter referred to as a common channel signal) SC; and a sub-channel dividing portion 40 (assigning portion) for dividing the common channel signal SC into a plurality of sub-channel signals (here, four sub-channel signals SS1-SS4)

each including one or more sub-channel components based on control information CTRL from the processor 20.

Namely, N sub-channel components are divided into i (i is an integer of 2 or more) sub-channel signals, where it is preferable to prevent the sub-channel components included in each sub-channel signal from being mutually overlapped.

For example, among sub-channel components 1–N (in the order of frequency), components 1–M are divided into a first sub-channel signals, and components M+1–N are divided into a second sub-channel signals. If they are divided into four, the sub-channel components 1–N may be divided into sub-channel components 1–K, K+1, L+1–M and M+1–N.

It is to be noted that the number of the sub-channel signals obtained by the above division is more than 1, preferably the number of the antenna elements (here 4) included in the array antenna.

The individual channel signals SI divided by the dividing portion 30 includes a plurality of sub-channel components, in which an IFFT professor (Inverse Fast Fourier Transform: a processor converting a frequency-domain signal into a time-domain signal) 81 performing the IFFT process based on those sub-channel components is provided.

Also, the sub-channel signals SS1-SS4 outputted from the sub-channel dividing portion 40 each include one or more sub-channel components, and IFFT processors 82_1-82_4 each perform the IFFT process for each sub-channel signal to output the time-domain signal.

While the dividing portion 30 is provided for outputting the individual channel signals SI and the common channel signal SC in divided form, it may be omitted by the MAC/PHY processor 20 separately outputting the individual channel signals SI and the common channel signal SC, or may be adapted to output only the common channel signal SC, where the individual channel signals SI may not be transmitted.

The base station 1 further comprises a control portion 50 generating a switching instruction signal INS2 and a coefficient generating instruction signal INS3 based on the control instruction signal INS1 from the dividing portion 30; a switch portion 60 controlling so that switches SW1-SW4 (hereinafter occasionally represented by a reference numeral SW) may output either the sub-channel signals SS or the individual channel signals SI based on the switching instruction signal INS2; and a weighting coefficient generation portion 70 generating coefficients $\alpha 1$-$\alpha 4$ for respectively adjusting amplitudes and phases of the individual channel signals SI outputted from the switches SW1-SW4 based on a received (receiving) radio wave-arrival direction RD from an user (not shown).

Namely, in case of providing a directivity to the individual channel signals SI, the amplitudes and the phases are adjusted to form a beam in a predetermined direction.

It is to be noted that the switch portion 60 is provided in consideration of transmitting the individual channel signals SI and the common channel signal SC on a time-sharing basis, where both signals may be combined by respectively using different bandwidths etc.

The above control instruction signal INS1 is for instructing to the control portion 50 which of the common channel signal SC or the individual channel signals SI the frame dividing portion 30 should output, wherein the control portion 50 provides the coefficient generating instruction signal INS3 to the weighting coefficient generation portion 70 only when the control instruction signal INS1 instructs the output of the individual channel signals SI.

Also, the array antenna 10 comprises multipliers 11_1-11_4 respectively multiplying coefficients $\alpha 1$-$\alpha 4$ with the individual channel signals SI, and amplifiers 12_1-12_4 respectively amplifying the individual signals SI whose amplitudes and phases are adjusted by the sub-channel signals SS and the multipliers 11_1-11_4, to be provided to the antenna elements ANT1-ANT4.

Next, an operation of this base station 1 will be described, in which firstly a transmitting operation of the common channel signal SC will be described referring to FIGS. 1-5 and a transmitting operation of the individual channel signals SI will be described referring to FIG. 6.

1) Transmitting Operation of Common Channel Signal SC: FIGS. 1-5

First, the MAC/PHY processor 20 shown in FIG. 1 generates a plurality of the sub-channel components CH composing the downlink frame FR_D, to be provided to the dividing portion 30.

Figure 2:
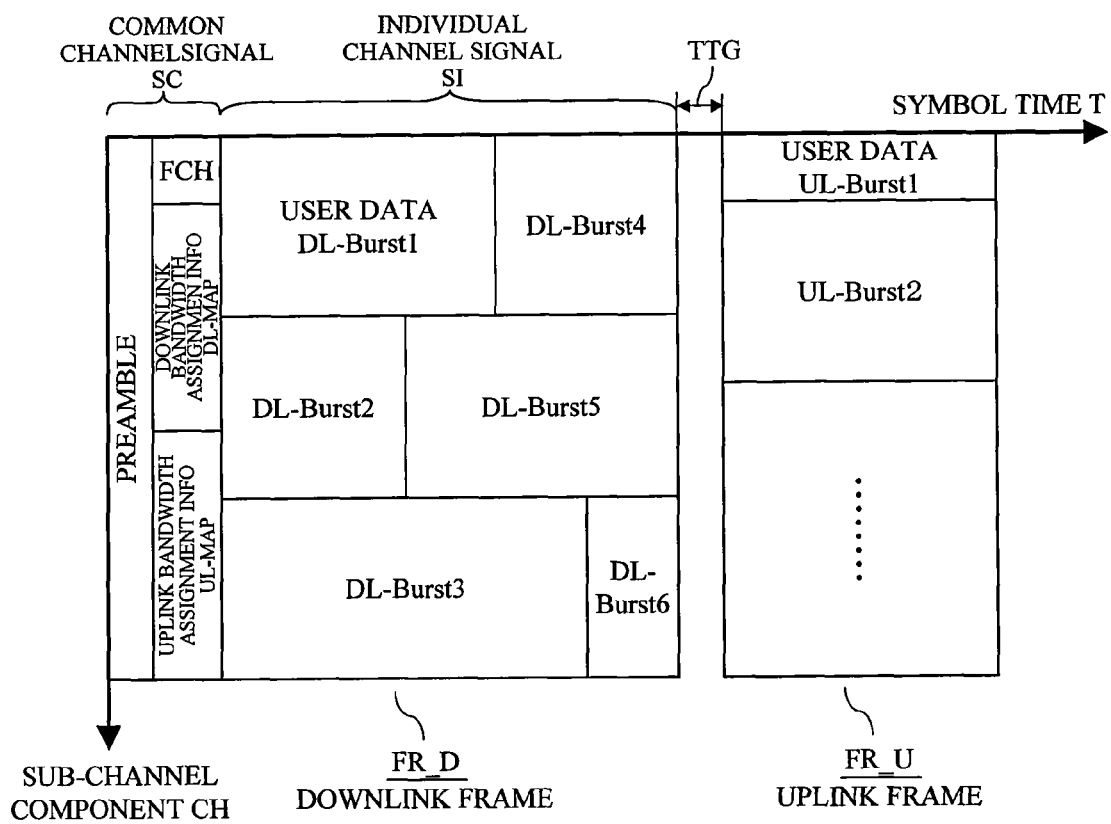
FIG. 2 is a time chart showing a frame format used in an embodiment [1] of a transmission device as well as an array antenna control method and device.

The downlink frame FR_D is composed of the common channel signal SC and the following individual channel signals SI as shown in FIG. 2, where the common channel signal SC comprises a preamble for establishing a synchronization between the base station 1 and the user receiving the downlink frame FR_D, FCH (Frame Control Header) set with a modulation method etc. as well as a downlink bandwidth assignment information DL-MAP and an uplink bandwidth assignment information UL-MAP respectively set with a bandwidth allocation of a downlink bandwidth and a bandwidth allocation of an uplink bandwidth assigned to the user. On the other hand, the individual channel signals SI comprise user data DL-Burst 1-DL-Burst 6 for the users (6 users in the example shown).

It is to be noted that the common channel signal SC can be made not only the above information but also a signal (e.g. announcement signal) transmitted in common to a plurality of the terminals within the cell. It is preferable to make a signal transmitted without a particular directivity the common channel signal SC. Also, the individual channel signals SI can be made signals transmitted to a specific terminal within the cell. It is preferable to make signals transmitted with a directivity the individual channel signals SI.

It is to be noted that after a fixed symbol time defined as TTG (Transmit/receive Transition Gap) from the reception time of the downlink frame FR_D has lapsed, each user transmits user data UL-Burst1, UL-Burst2, . . . to the base station 1 as the uplink frame FR_U according to the bandwidth allocation set in the above uplink bandwidth assignment information UL-MAP, where TTG can be omitted as 0.

The dividing portion 30 having received the common channel signal SC in the above downlink frame FR_D provides this common channel signal SC to the sub-channel dividing portion 40 and provides the control instruction signal INS1 indicating this fact to the control portion 50.

Figure 3:
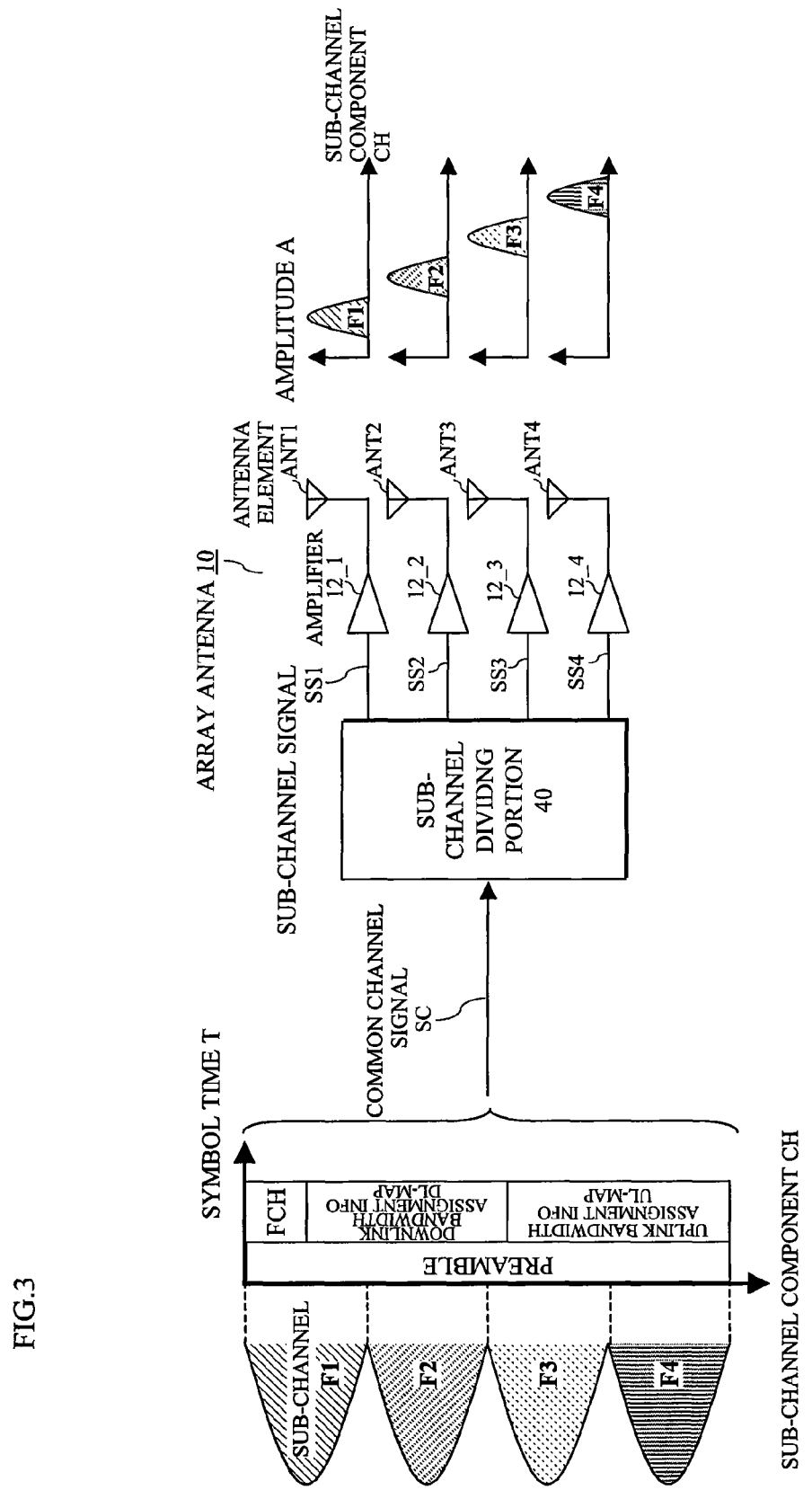
FIG. 3 is a block diagram showing a transmitting operation of a common channel signal in an embodiment [1] of a transmission device as well as an array antenna control method and device.

The control portion 50 having received the control instruction signal INS1 provides the switching instruction signal INS2 to the switching portion 60, which controls the switches SW1-SW4 so that they may select the outputs from the sub-channel dividing portion 40. At this time, the control portion 50 has not yet generated the coefficient generating instruction signal INS3. On the other hand, the sub-channel dividing portion 40 having received the common channel signal SC divides, as shown in FIG. 3, the sub-channel components of the common channel signal SC into four sub-channels F1-F4 to be respectively and concurrently provided to the switches SW1-SW4 (not shown) as the sub-channel signals SS1-SS4. Namely, the signal to be transmitted without any specific directivity is divided into a sub-channel component belonging to a frequency band F1 as a signal SS1, a sub-channel component belonging to a frequency band F2 as a signal SS2, a sub-channel component belonging to a frequency band F3 as a signal SS3 and a sub-channel component belonging to a frequency band F4 as a signal SS4.

Since the switches SW1-SW4 are controlled to a state for selecting the sub-channel signals SS1-SS4 from the sub-channel dividing portion 40, the sub-channel signals SS1-SS4 are concurrently provided to the array antenna 10 through the switches SW1-SW4.

At this time, since the coefficient α is not outputted from the weighting coefficient generation portion 70 shown in FIG. 1, the sub-channel signals SS1-SS4 are respectively and concurrently provided to the amplifiers 12_1-12_4 as non-directivity signals without being subjected to the operations of the multipliers 11_1-11_4 (not shown) in the array antenna 10. The amplifiers 12_1-12_4 respectively amplify the sub-channel signals SS1-SS4 to be transmitted through the antenna elements ANT1-ANT4.

Thus, the sub-channel signals of different frequencies are respectively assigned to the antenna elements and transmitted from the antenna elements, so that the base station 1 can transmit the common channel signal SC without a special directivity or with non-directivity.

It is to be noted that the amplitude and the phase can also be adjusted in each antenna element.

Hereinafter, a specific arrangement and an operation of the above-noted sub-channel dividing portion 40 will be described referring to FIGS. 4 and 5.

Arrangement and Operation of Sub-Channel Dividing Portion 40: FIGS. 4 and 5

Figure 4:
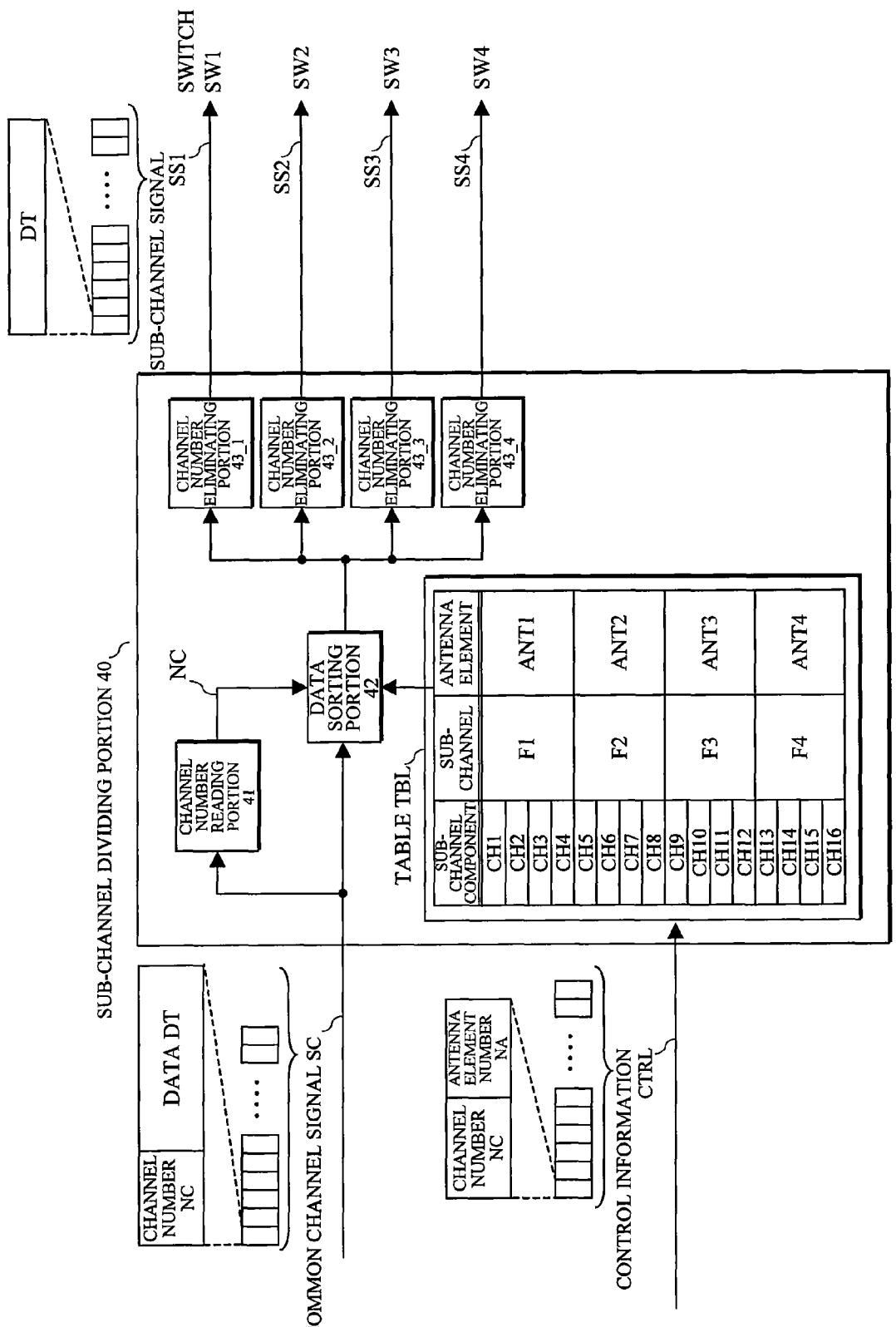
FIG. 4 is a block diagram showing an arrangement and an operation of a sub-channel dividing portion used in an embodiment [1] of a transmission device as well as an array antenna control method and device.

As shown in FIG. 4, the sub-channel dividing portion 40 comprises a table TBL for associating respectively 16 sub-channel components CH1-CH16 with the antenna elements ANT1-ANT4 as an example composing the common channel signal SC; a channel number reading portion 41 for reading a channel number NC added to a data DT for each sub-channel component from the common channel signal SC; a data sorting portion 42 for retrieving an antenna element associated with a sub-channel component CH consistent with the channel number NC from the table TBL and sorting the common channel signal SC into the switch SW connected to the antenna elements; and channel number eliminating portions 43_1-43_4 provided between the data sorting portion 42 and the switches SW1-SW4 for eliminating the channel number NC from the common channel signal SC sorted.

It is here assumed that the above channel number NC is added every time the MAC/PHY processor 20 generates the common channel signal SC.

Figure 5A:
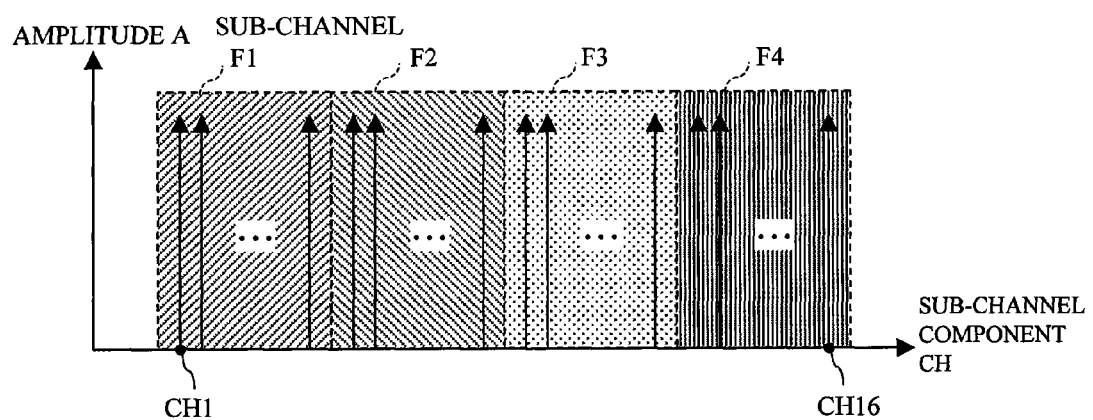
FIGS. 5A and 5B are diagrams showing a sub-channel example in an embodiment [1] of a transmission device as well as an array antenna control method and device.
Figure 5B:
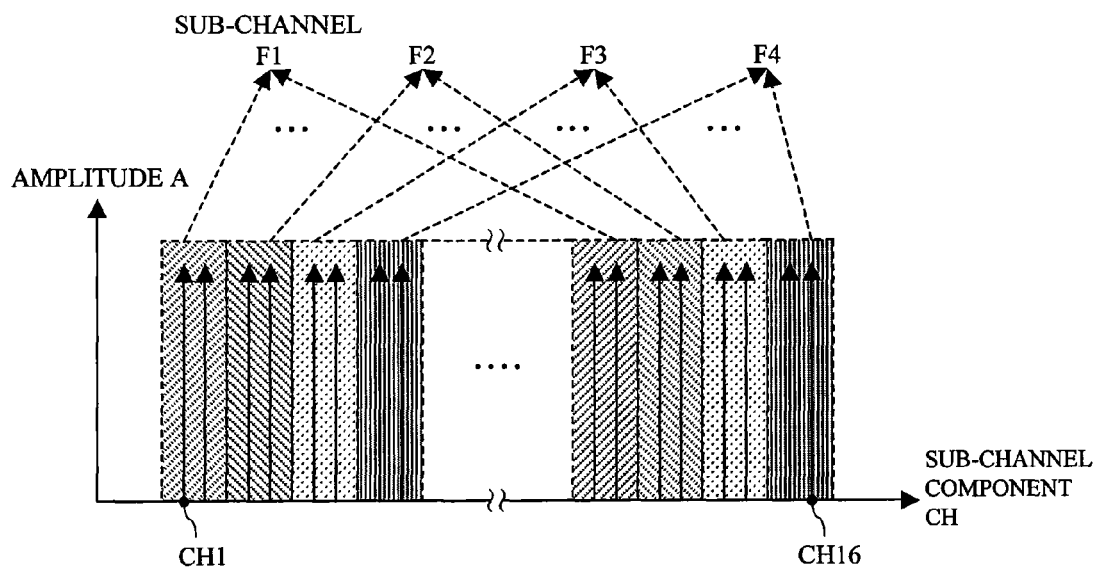

In operation, the sub-channel dividing portion 40 receives, in advance of all processes, control information CTRL from the MAC/PHY processor 20 shown in FIG. 1 where the channel numbers NC of the sub-channel components CH1-CH16 and numbers NA of the antenna elements ANT1-ANT4 are paired, thereby preparing the table TBL based on this control information CTRL. In this example, the sub-channel components CH1-CH16 shown in FIG. 5A are divided into 4 sub-channels, i.e. F1 (sub-channel components CH1-CH4), F2 (CH5-CH8), F3 (CH9-CH12) and F4 (CH13-CH16), to be respectively associated with the antenna elements ANT1-ANT4. Also, the sub-channels F1-F4 may be obtained by selecting, as shown in FIG. 5B, e.g. every two of the sub-channel components CH1-CH16 as divided sequentially. Also in this case, the following description will be similarly applied.

On the other hand, upon having received the common channel signal SC from the MAC/PHY processor 20, the channel number reading portion 41 in the sub-channel dividing portion 40 reads the channel number NC added to the data DT from the common channel signal SC to be provided to the data sorting portion 42.

The data sorting portion 42 responsively retrieves the antenna elements associated with the sub-channel component CH consistent with the channel number NC from the table TBL and provides the common channel signal SC to one of the channel number eliminating portions 43_1-43_4. For example, if the channel number NC is consistent with the sub-channel component CH1, the antenna element ANT1 associated with the sub-channel component CH1 is retrieved from the table TBL, so that the data sorting portion 42 provides the data DT added with the channel number NC to the channel number eliminating portion 43_1.

Responsively, the channel number eliminating portion 43_1 provides the data DT where the channel number NC is eliminated from the common channel signal SC to the switch SW1. Similarly, the channel number eliminating portions 43_1-43_4 respectively provide the data DT where the channel number NC is eliminated to the switches SW2-SW4 every time the data DT is sorted from the data sorting portion 42.

Thus, the sub-channel dividing portion 40 can respectively provide the sub-channel signals SS1-SS4 obtained by dividing the common channel signal SC into four to the switches SW1-SW4.

2) Transmitting Operation of Individual Channel Signals SI: FIG. 6

Upon having received the individual channel signals SI shown in FIG. 2, the dividing portion 30 shown in FIG. 1 provides the individual channel signals SI to the IFFT processor 81, in which the signals converted into the time-domain signals are provided in common to the switches SW1-SW4 in the switch portion 60. Meanwhile, the dividing portion 30 provides to the control portion 50 the control instruction signal INS1 indicating that the individual channel signals SI have been provided. The control portion 50 having received the control instruction signal INS1 provides the switching instruction signal INS2 to the switch portion 60, which controls the switches SW-SW4 to select the individual channel signals SI. At the same time, the control portion 50 provides the coefficient generating instruction signal INS3 to the weighting coefficient generation portion 70.

Figure 6:
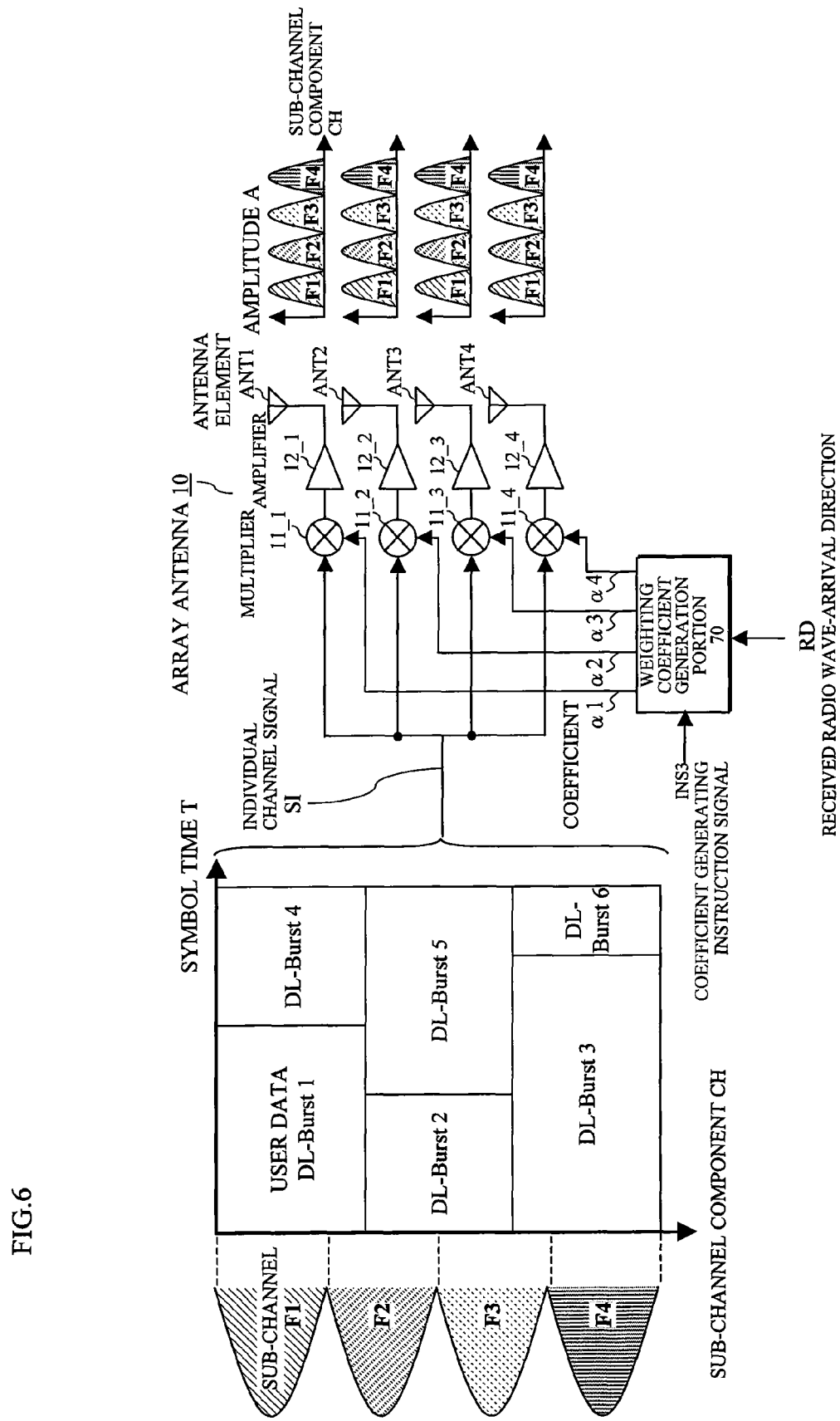
FIG. 6 is a block diagram showing a transmitting operation of individual channel signals in an embodiment [1] of a transmission device as well as an array antenna control method and device.

The individual channel signals SI are respectively provided, as shown in FIG. 6, to the multipliers 11_1-11_4 in the array antenna 10 through the switches SW1-SW4. At this time, the weighting coefficient generation portion 70 generates, based on the received radio wave-arrival direction RD from each user, the coefficients α1-α4 for adjusting the amplitude and the phase of the individual channel signals SI outputted from the switches SW1-SW4 to be provided to the multipliers 11_1-11_4. The coefficients α1-α4 are here set to a value such as strengthening the interferences between the individual channel signals SI with respect to the received radio wave-arrival direction RD.

The multipliers 11_1-11_4 respectively multiply the individual channel signals SI by the coefficients α1-α4 to be provided to the amplifiers 12_1-12_4. The amplifiers 12_1-12_4 respectively amplify the individual channel signals SI having been multiplied by mutually different coefficients to be transmitted from the antenna elements ANT1-ANT4.

Thus, the base station 1 provides the signal converted into time domain in common to the antenna elements composing the array antenna, thereby enabling the individual channel signals SI to be transmitted with a desired directivity.

Figure 7:
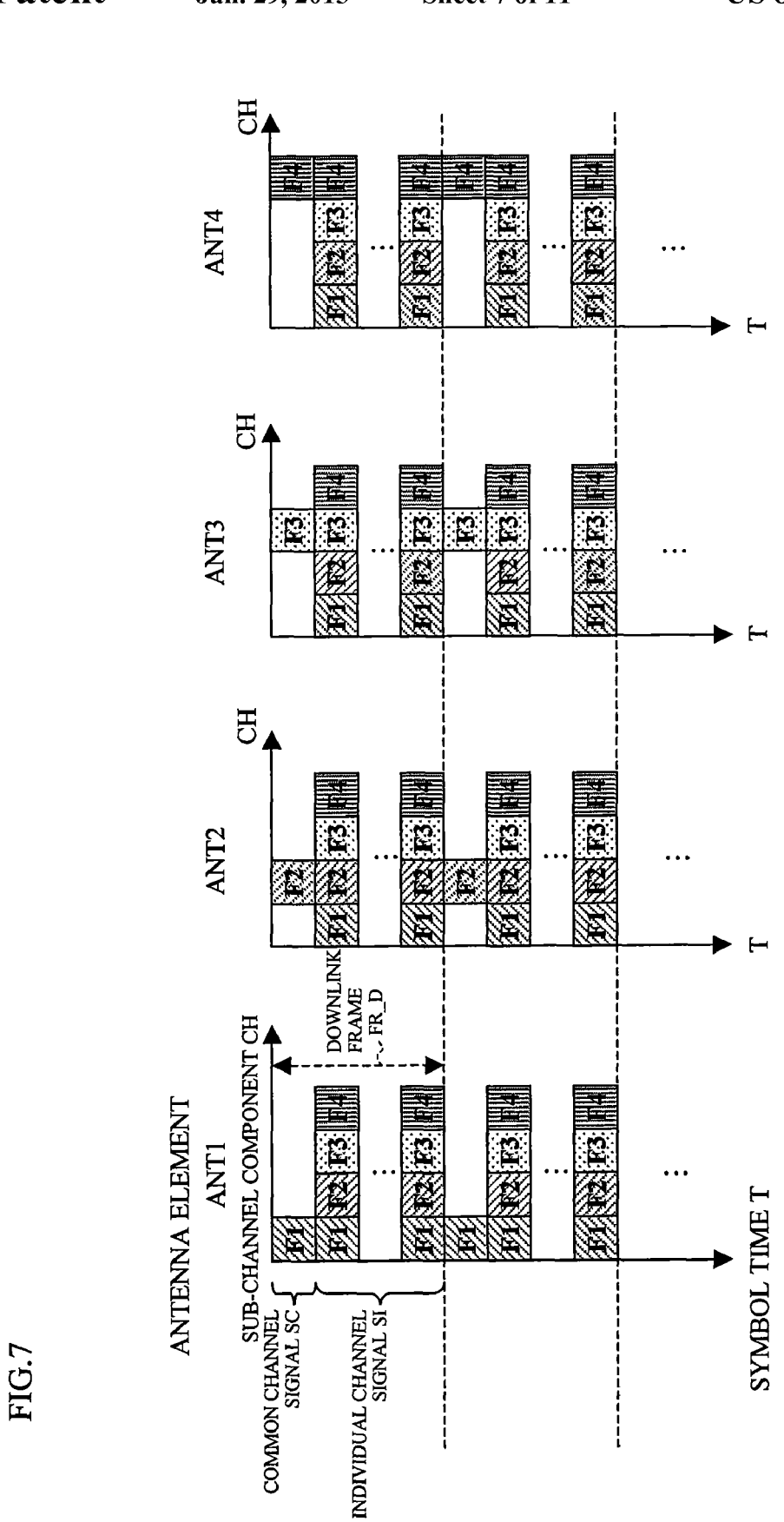
FIG. 7 is a time chart showing an example of transmitting signals from each antenna element in an embodiment [1] of a transmission device as well as an array antenna control method and device.

By repeatedly performing the transmitting operation of the above common channel signal SC and the transmitting operation of the individual channel signals SI, signals shown in FIG. 7 are to be transmitted from the antenna elements ANT1-ANT4. Namely, every time the downlink frame FR_D is generated, the antenna elements ANT1-ANT4 concurrently transmit the data (namely, sub-channel signals SS1-SS4) respectively corresponding to the sub-channels F1-F4 within the common channel signal SC with non-directivity, and transmit the data (namely, the individual channel signals SI themselves) corresponding to all of the sub-channels F1-F4 within the individual channel signals SI with directivity.

Figure 8:
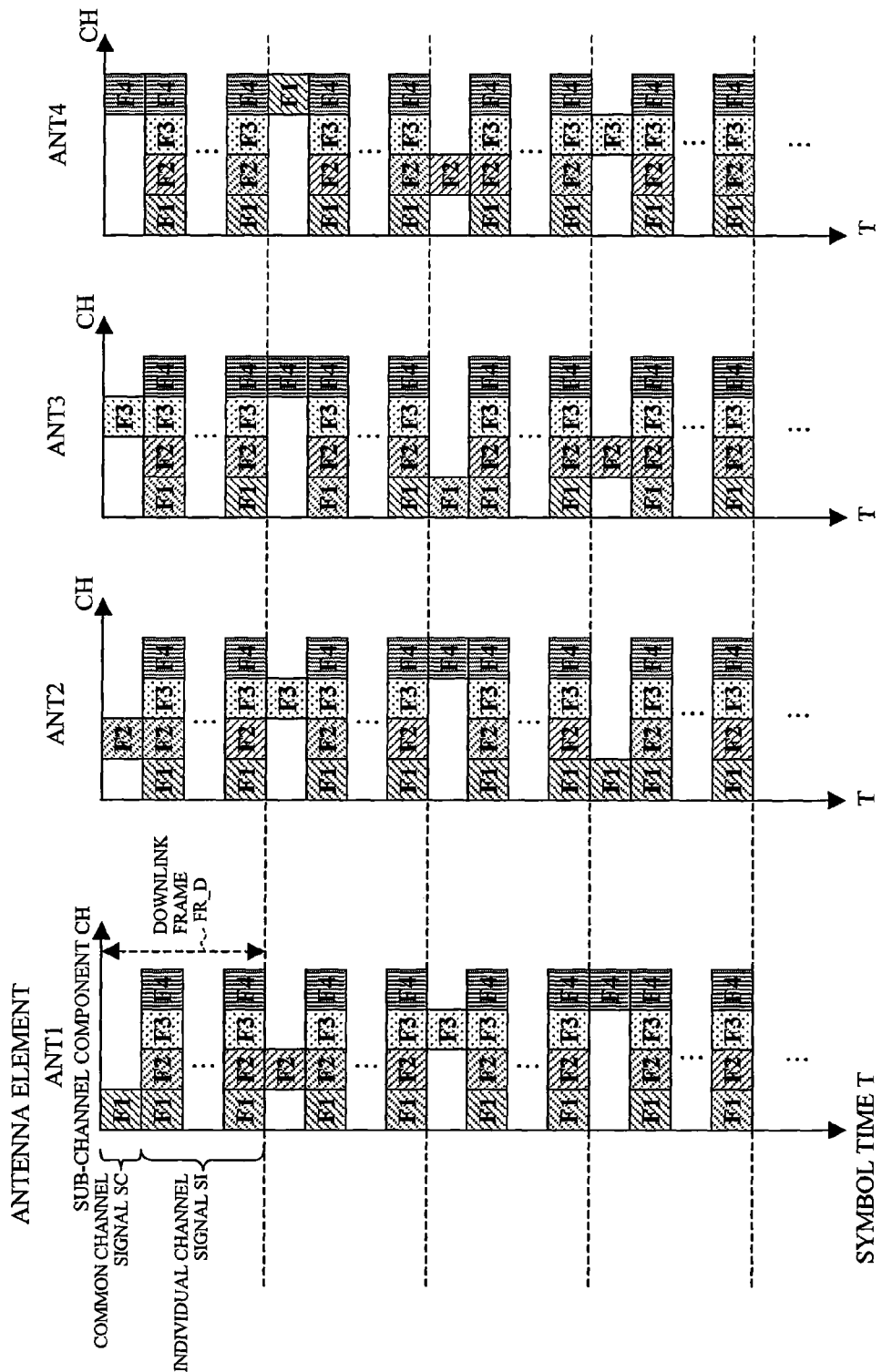
FIG. 8 is a time chart showing other examples of transmitting signals from each antenna element in an embodiment [1] of a transmission device as well as an array antenna control method and device.

Also, the sub-channel dividing portion 40 shown in FIG. 4 may change in a circulating mode the associating of the sub-channels F1-F4 with the antenna elements ANT1-ANT4 within the table TBL every time the common channel signal SC is generated, thereby circulating the sub-channels F1-F4 assigned to the antenna elements ANT1-ANT4 as shown in FIG. 8.

Figure 9:
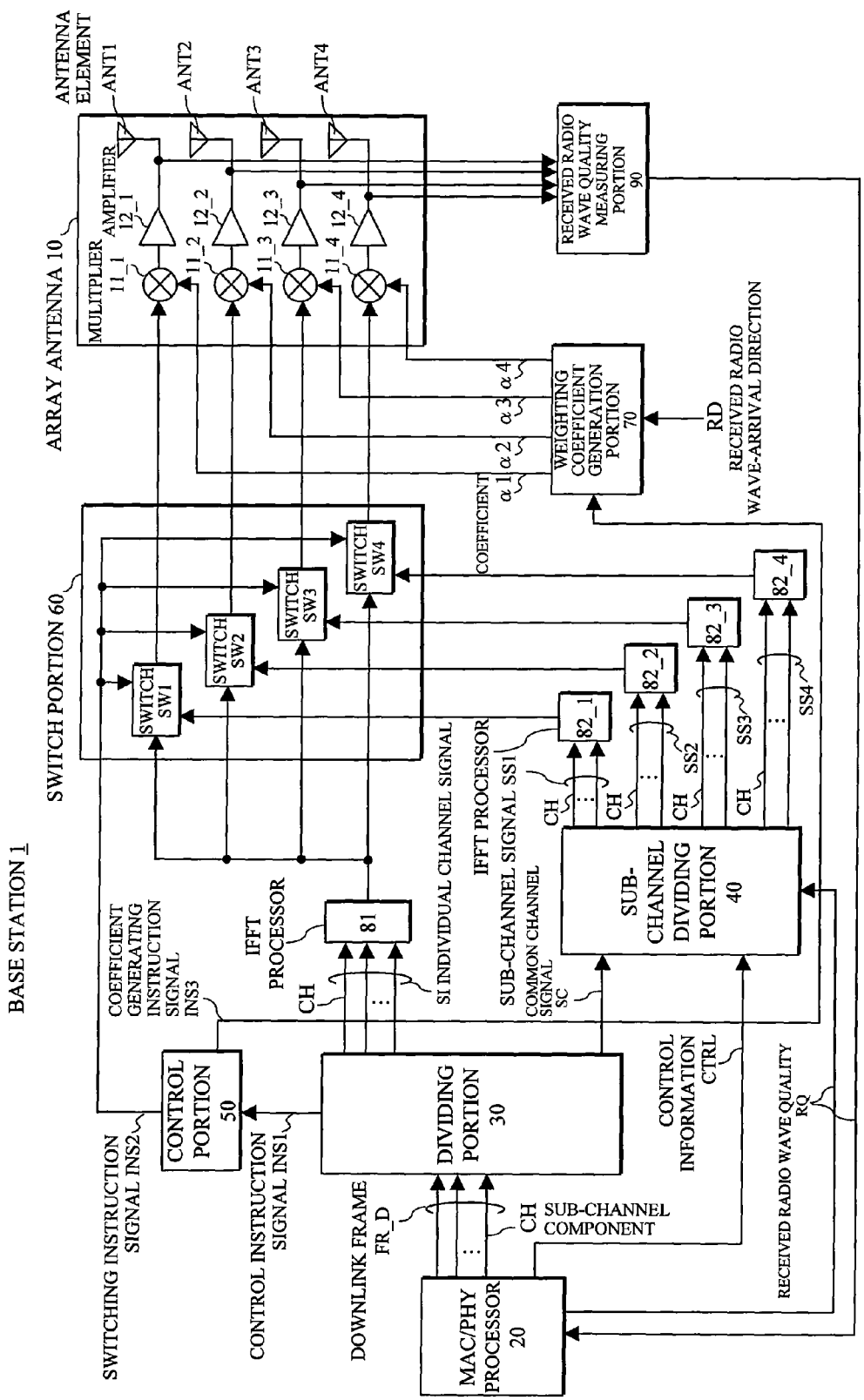
FIG. 9 is a block diagram showing an arrangement in an embodiment [2] of a transmission device as well as an array antenna control method and device.
Figure 10:
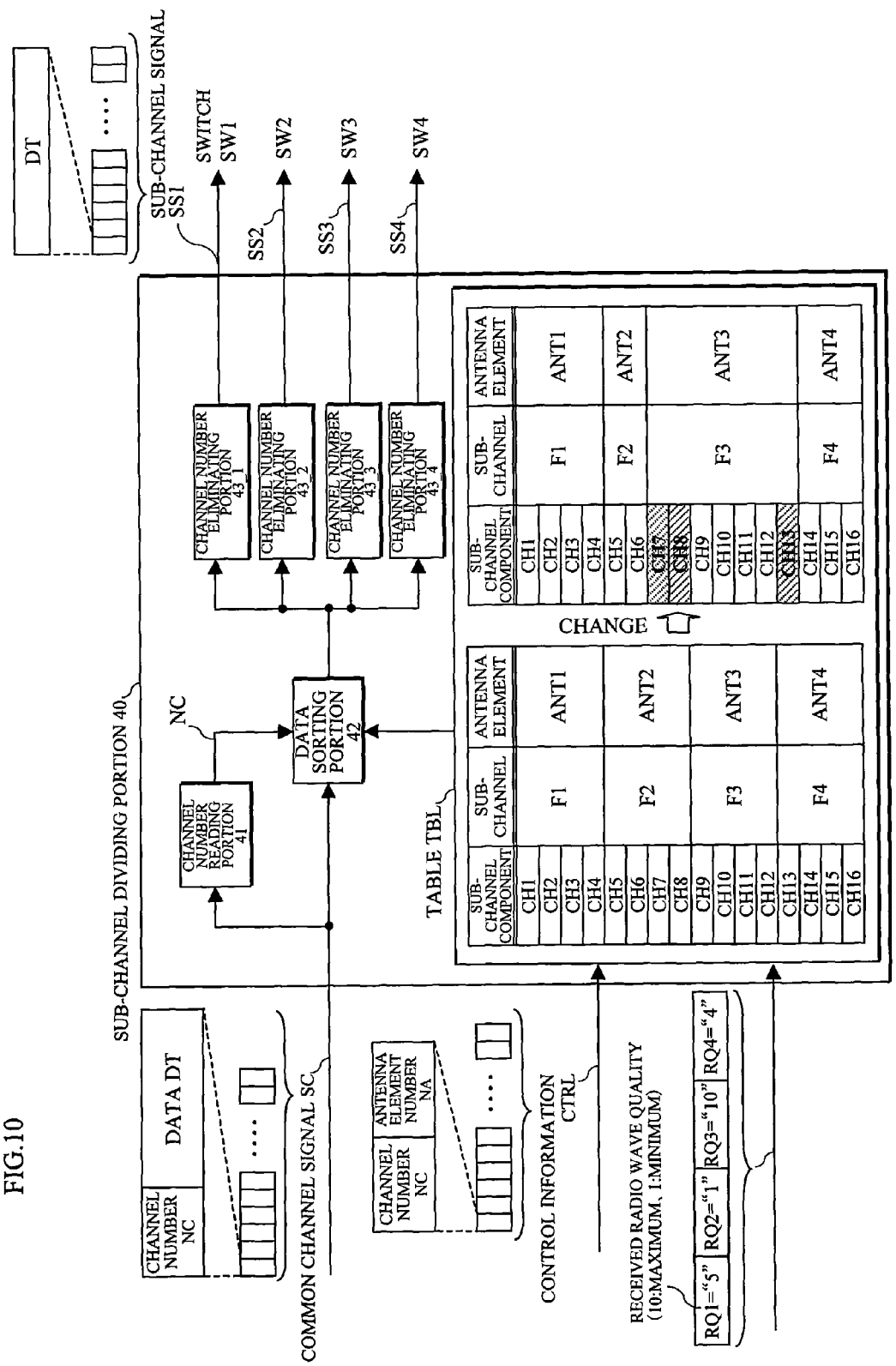
FIG. 10 is a block diagram showing an arrangement and an operation of a sub-channel dividing portion used in an embodiment [2] of a transmission device as well as an array antenna control method and device.
Figure 11:
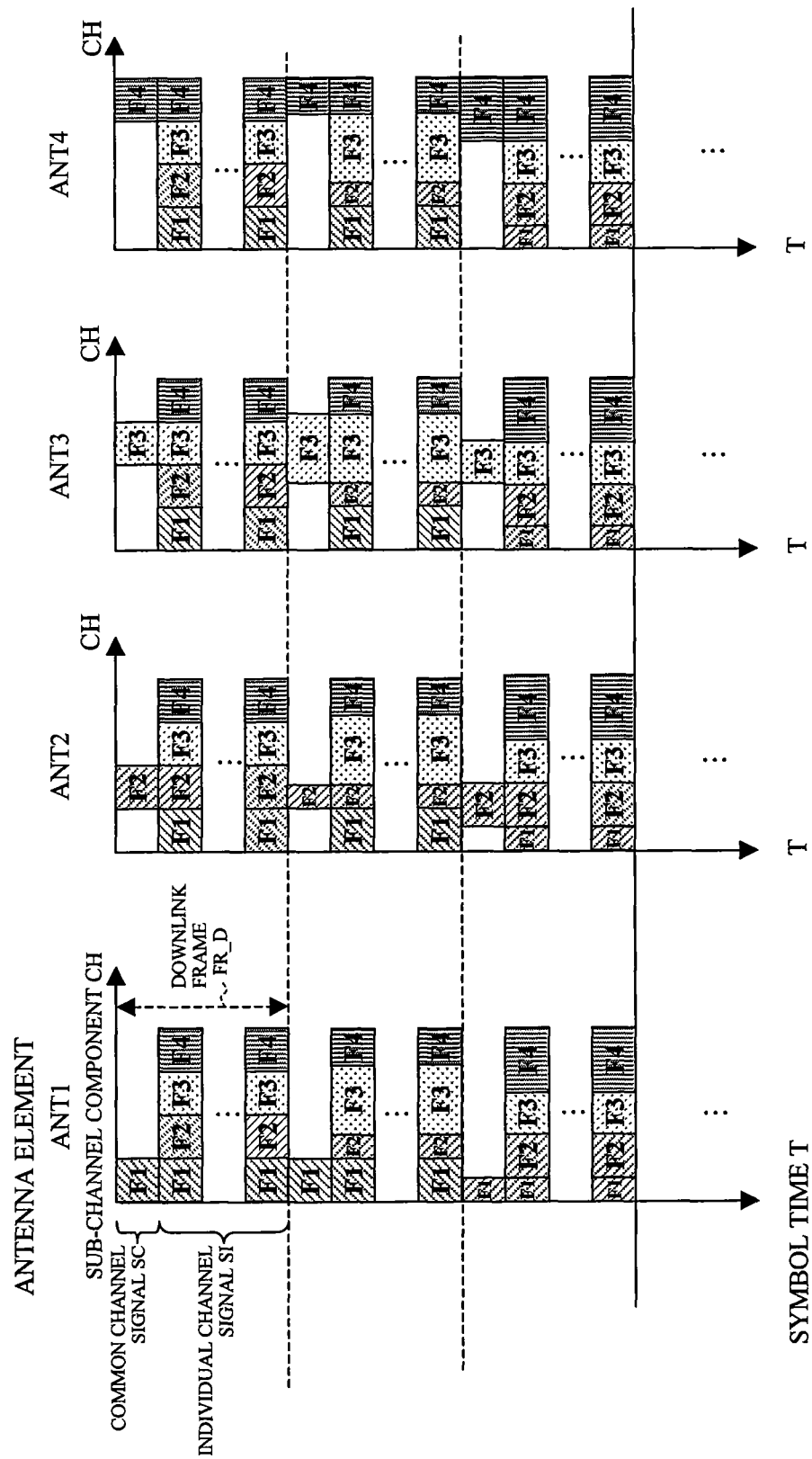
FIG. 11 is a time chart showing an example of transmitting signals from each antenna element in an embodiment [2] of a transmission device as well as an array antenna control method and device.

Embodiment [2]: FIGS. 9-11

In the base station 1 according to the embodiment shown in FIG. 9, the MAC/PHY processor 20 further provides the received radio wave qualities RQ1-RQ4 (hereinafter occasionally represented by a reference numeral RQ) of the antenna elements ANT1-ANT4 to the sub-channel dividing portion 40.

The above received radio wave quality RQ is obtained by a received radio wave quality measuring portion 90 measuring the quality of signals received by the antenna elements. Namely, in case of adopting TDD, the received radio wave qualities in the antenna elements ANT1-ANT4 are considered to be variable similarly to the transmitted radio wave qualities, so that the transmitted radio wave qualities of the antenna elements are estimated based on the received radio wave qualities. It is to be noted that the received radio wave qualities in the antenna elements can adopt e.g. an average of the received radio wave qualities of the sub-channel components CH1-CH6 for the antenna elements.

Next, an operation in the embodiment will be described, where the operation except the sub-channel dividing portion 40 is the same as the above embodiment [1], so that the description will be omitted.

First, the sub-channel dividing portion 40 calculates the number of sub-channel components Y1-Y4 to be assigned to the antenna elements ANT1-ANT4 in accordance with the following Equation (1):

$$Yi = \left\{(CN - X) \times \frac{RQi}{\sum_{i=1}^{X} RQi}\right\} + 1 \qquad \text{Equation (1)}$$

$\begin{pmatrix} Yi: & \text{Number of sub-channel components assigned to} \\ & \text{the antenna } ANTi \\ CN: & \text{Number of all sub-channel components} \\ X: & \text{Number of antenna elements} \\ RQi: & \text{Received radio wave quality of antenna elements} \\ & ANTi \end{pmatrix}$ where CN in the above Equation (1) denotes the number of all sub-channel components ("16" in this example) composing the common channel signal SC and X denotes the number of antenna elements ("4" in this example).

Also, the fourth term of the right side in the above Equation (1) indicates that the sub-channel components are fixedly assigned one by one to the antenna elements ANT1-ANT4.

The third term of the right side also indicates a percentage of the received radio wave qualities with request to the sum of the received radio wave qualities RQ1-RQ4 (namely, a ratio between the received radio wave qualities RQ1-RQ4), and the product of the difference between the first term and the second term of the right side and the third term indicates that the rest of the sub-channel components except the number (4) of the sub-channel components are assigned to the antenna elements ANT1-ANT4 depending on the ratio between the received radio wave qualities RQ1-RQ4.

Now assuming that as shown in FIG. 10 the received radio wave qualities RQ1-RQ4 of the antenna elements ANT1-ANT4 are respectively measured as "5", "1 (minimum)", "10 (maximum)" and "4", the number of the sub-channel components Y1-Y4 assigned to the antenna elements ANT1-ANT4 are respectively calculated as "4", "2", "7" and "3" from the above Equation (1).

For example, if the table TBL is set similarly to FIG. 4, where four sub-channel components are assigned to the antenna elements ANT1-ANT4, the sub-channel dividing portion 40 recognizes that from the above number of the sub-channel components assigned Y1-Y4 the sub-channel components assigned to the antenna element ANT1 may remain as they are, whereas the sub-channel components assigned to the antenna elements ANT2 and ANT4 should be respectively decreased by "2" and "1" and the sub-channel components assigned to the antenna element ANT3 should be increased by "3", thereby changing the sub-channel components CH7, CH8 and CH13 in the table TBL in association with to the antenna element ANT3.

Then, the data sorting portion 42 performs sorting of the common channel signal SC as with the above embodiment [1] based on the table TBL after changed. Namely, after having changed the table TBL, the data DT added with the channel number NC consistent with the sub-channel components CH7, CH8 or CH13 are sorted into the channel number eliminating portion 43_2, not the channel number eliminating portion 43_2 or 43_4, to be provided to the antenna element ANT3 of the highest received radio wave quality as the sub-channel signal SS3.

By performing it every time the received radio wave qualities RQ are measured, the common channel signal SC is properly transmitted from the antenna elements ANT1-ANT4 depending on the received radio wave qualities (namely the transmitted radio wave qualities) as shown in FIG. 11, so that the common channel signal SC can be reliably propagated to all users.

It is also to be noted that the present invention is not limited by the above-mentioned embodiments, and it is obvious that various modifications may be made by one skilled in the art based on the recitation of the claims.

This invention claimed is

1. An array antenna control method comprising:
    a first step of frequency dividing a common channel signal to all users into a number of sub-channel signals, corresponding to a number of antenna elements composing an array antenna, to be transmitted with non-directivity by concurrently providing the sub-channel signals to the corresponding antenna elements; and
    a second step of transmitting individual channel signals, for each user, switchable from the common channel signal with a desired directivity by using the antenna elements,
    each of the antenna elements transmitting one of the sub-channel signals of different sub-channel components composing the common channel signal.

2. The array antenna control method as claimed in claim 1, wherein the first step comprises:
a third step of preparing a table associating the sub-channel components with the antenna elements; and
a fourth step of sorting data for each sub-channel component in the common channel signal based on the table, thereby generating the sub-channel signals.

3. The array antenna control method as claimed in claim 2, wherein the table associates each sub-channel obtained by dividing all the sub-channel components for every sub-channel components by a predetermined number, with each antenna element.

4. The array antenna control method as claimed in claim 2, wherein the table associates each sub-channel obtained by selecting and dividing all the sub-channel components by a predetermined number in order, with each antenna element.

5. The array antenna control method as claimed in claim 3, wherein the third step comprises a step of changing in a circulating mode the associating of each sub-channel with each antenna element in the table every time the common channel signal is generated.

6. The array antenna control method as claimed in claim 1, wherein the first step comprises:
a third step of preparing a table associating each of the sub-channel components with each antenna element depending on a given received radio wave quality for each antenna element; and
a fourth step of sorting data for each sub-channel component in the common channel signal based on the table, thereby generating each sub-channel signal.

7. The array antenna control method as claimed in claim 6, wherein the table associates at least one sub-channel component among all the sub-channel components with one antenna element, where when there remains a sub-channel component, the remaining sub-channel component is assigned to each antenna element depending on a ratio between received radio wave qualities of the antenna elements.

8. The array antenna control method as claimed in claim 1, wherein the first step comprises a step of applying each sub-channel signal as a signal without directivity to each antenna element; and
the second step comprises a step of adjusting an amplitude and a phase of each individual channel signal for each antenna element so that each individual channel signal has the desired directivity due to interferences among the antenna elements.

9. The array antenna control method as claimed in claim 1, wherein the common channel signal and the individual channel signals compose a downlink frame according to a frequency division multiplying method.

10. An array antenna control device comprising:
a first means frequency dividing a common channel signal to all users into a number of sub-channel signals, corresponding to a number of antenna elements composing an array antenna, to be transmitted with non-directivity by concurrently providing the sub-channel signals to the corresponding antenna elements; and
a second means transmitting individual channel signals, for each user, switchable from the common channel signal with a desired directivity by using the antenna elements, each of the antenna elements transmitting one of the sub-channel signals of different sub-channel components composing the common channel signal.

11. The array antenna control device as claimed in claim 10, wherein the first means comprises:
a third means preparing a table associating the sub-channel components with the antenna elements; and
a fourth means sorting data for each sub-channel component in the common channel signal based on the table, thereby generating the sub-channel signals.

12. The array antenna control device as claimed in claim 11, wherein the table associates each sub-channel obtained by dividing all the sub-channel components for every sub-channel components by a predetermined number, with each antenna element.

13. The array antenna control device as claimed in claim 11, wherein the table associates each sub-channel signal obtained by selecting and dividing all the sub-channel components by a predetermined number in order, with each antenna element.

14. The array antenna control device as claimed in claim 12, wherein the third means comprises means changing in a circulating mode the associating of each sub-channel with each antenna element in the table every time the common channel signal is generated.

15. The array antenna control device as claimed in claim 10, wherein the first means comprises:
a third means preparing a table associating each of the sub-channel components with each antenna element depending on a given received radio wave quality for each antenna element; and
a fourth means sorting data for each sub-channel component in the common channel signal based on the table, thereby generating each sub-channel signal.

16. The array antenna control device as claimed in claim 15, wherein the table associates at least one sub-channel component among all the sub-channel components with one antenna element, where when there remains a sub-channel component, the remaining sub-channel component is assigned to each antenna element depending on a ratio between received radio wave qualities of the antenna elements.

17. The array antenna control device as claimed in claim 10, wherein the first means comprises means applying each sub-channel signal as a signal without directivity to each antenna element; and
the second means comprises means adjusting an amplitude and a phase of each individual channel signal for each antenna element so that each individual channel signal has the desired directivity due to interferences among the antenna elements.

18. The array antenna control device as claimed in claim 10, wherein the common channel signal and the individual channel signals compose a downlink frame according to a frequency division multiplying method.

* * * * *